United States Patent [19]
Nishibori

[11] Patent Number: 6,140,378
[45] Date of Patent: Oct. 31, 2000

[54] METHOD OF RECOVERING PHOTOGRAPHIC FILM

[75] Inventor: Sadao Nishibori, Tokyo, Japan

[73] Assignee: Ein Kohsan Co., Ltd., Tokyo, Japan

[21] Appl. No.: 09/139,320

[22] Filed: Aug. 25, 1998

[30] Foreign Application Priority Data

Aug. 26, 1997 [JP] Japan .................................. 9-230017

[51] Int. Cl.[7] .................................. C08J 11/04
[52] U.S. Cl. ............................. 521/45; 521/40.5; 521/48
[58] Field of Search ............................. 521/48, 40, 40.5; 264/911; 241/24; 528/499, 500

[56] References Cited

U.S. PATENT DOCUMENTS

| | | | |
|---|---|---|---|
| 4,150,977 | 4/1979 | Phillips | 75/118 P |
| 4,602,046 | 7/1986 | Buser et al. | 521/46 |
| 4,612,057 | 9/1986 | Buser | 134/13 |
| 4,799,954 | 1/1989 | Hochberg | 75/118 |
| 5,323,971 | 6/1994 | Nishibori | 241/3 |
| 5,368,949 | 11/1994 | Ushimaru et al. | 428/694 BS |
| 5,475,036 | 12/1995 | Hosoyama | 541/40 |
| 5,785,259 | 7/1998 | Nishibori | 241/41.18 |
| 5,871,161 | 2/1999 | Nishibori | 241/19 |

FOREIGN PATENT DOCUMENTS

| | | | |
|---|---|---|---|
| 0 801 168 A1 | 10/1997 | European Pat. Off. | |
| 62-258454 | 11/1987 | Japan | 11/24 |

*Primary Examiner*—Vasu Jagannathan
*Assistant Examiner*—Katarzyna Wyrozebski
*Attorney, Agent, or Firm*—Christie, Parker & Hale, LLP

[57] ABSTRACT

A method for recycling a photographic film is provided. The method comprises shredding the photographic film into a plurality of fragments to be processed; swelling the fragments to be processed formed in the shredding step by dipping each of these fragments to be processed into hot water; and drying the fragments to be processed swollen in the swelling step by applying an impact frictional striking force to each of these fragments to be processed, peeling layers other than a resin material base of the photographic film, i.e., a protective coat, an emulsion layer, and a base coat layer, from each fragment to be processed and classifying these layers, and grading the resin material base so as to be resin material to be recovered.

2 Claims, 5 Drawing Sheets

METHOD OF RECOVERING PHOTOGRAPHIC FILM

CROSS REFERENCE TO RELATED APPLICATION

This application claims priority of Japanese Patent Application No. 230017/97, filed Aug. 26, 1997.

FIELD OF THE INVENTION

This invention relates to a method for recycling photographic films. Precisely, the object to be processed in this method is the photographic film such as a black and white photographic film, x-ray photographic film, and various types of photographic films, each of which is composed of multi layer of a protective coat, an emulsion layer, a base coat layer, a base, and an anti halation layer laminated in this order.

For the above mentioned base, in these days, instead of a conventional photographic plate or TAC, polyester having the thickness of 0.08 to 0.13 mm is commonly used. The protective coat is formed by coating gelatin in a thin layer on the emulsion layer of film.

The emulsion layer is formed by uniformly dispersing silver halide into the gelatin so as form a thin coat. Then the emulsion layer is photosensitive. The anti halation layer is coated in order to eliminate or decrease reflected light caused at a boundary surface between the film base and air.

The present invention relates to a method for recycling a photographic film disposed of after its usage, by which the resin material base 83*a* made of synthetic resin is collected as resin material to be recovered as the material of the photographic film by peeling the layers other than the base, i.e., the protective coat, the emulsion layer, the base coat layer and anti-halation layer, off the photographic film and by which silver contained in the above emulsion layer, i.e., silver halide is also collected.

BACKGROUND OF THE INVENTION

The amount of shipment for photographic films is 213,851 ($10^3$ m$^2$). Then, the amount of shipment for specific films such as x-ray photographic films, photographic films used for printing processes and the like is about 210,000 ($10^3$ m$^2$). In commerical applications, these photographic films are used as common black and white photographic films, specific photographic films such as x-ray photographic films, and the like.

Each photographic film disposed of after its usage has normally been discarded before incineration. Alternatively, from the emulsion layer in each film, the silver has been collected by utilizing enzyme or caustic soda or with electrolysis. However, the incineration of film may generate harmful gas, while the collection of silver causes a problem related to pollution of river water due to waste water.

That is to say, recycling of photographic film has been performed in only a very limited range. Particularly, the resin material of base has not been recycled at all, and it always has to be discarded.

SUMMARY OF THE INVENTION

The present invention has been developed for solving the above mentioned problems. One object of the present invention is to provide a relatively simple and easy method for recycling photographic film disposed of after its use by which the synthetic resin material as the main material of the photographic film is graded so as to be a resin material to be recovered by peeling the layers other than the base, i.e., the protective coat, the emulsion layer, and the base coat layer, off the photographic film and classifying them, by which, the above mentioned silver is collected, and by which the range of re-use of photographic film can be enlarged.

In order to accomplish the above object, according to the present invention, there is provided a method for recycling a photographic film comprising at least the following steps of:

shredding the photographic film into a plurality of fragments to be processed;

swelling the fragments formed in the shredding step by dipping each of these fragments into hot water; and drying the fragments swollen in the swelling step by applying an impact frictional striking force to each of these fragments, peeling layers other than a resin material base 83*a* of each photographic film, i.e., a protective coat, an emulsion layer, and a base coat layer, off each fragment, and classifying these layers, and grading the resin material base 83*a* so as to be a resin material to be recovered.

The step where the impact frictional striking force is applied to the fragments to be processed, the layers other than the base, i.e., the protective coat, the emulsion layer, the base coat layer, are peeled, and the resin material base 83*a* is graded so as to be the resin material to be recovered, can be repetitively carried out several times.

The method for recycling the photographic film defined above further comprises, after the above mentioned drying, peeling, classifying and grading steps, a step of selectively recovering, by screening, the classified resin material base 83*a* and the silver contained in the emulsion layer.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENT

Figure 1:
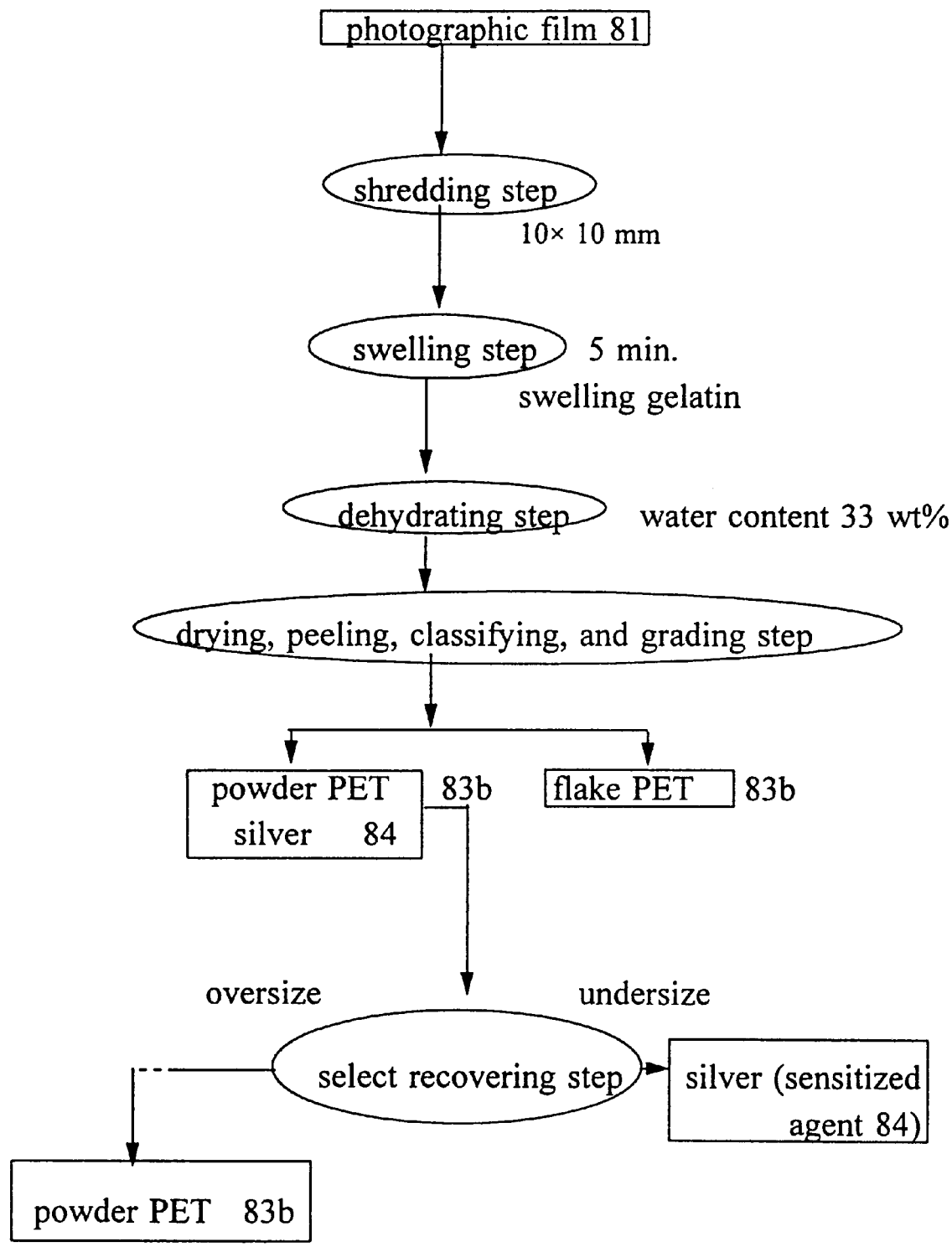
FIG. 1 is a system diagram which schematically shows the outline and principle of process steps in the basic embodiment of a method for recycling a photographic film as an object to be processed by the present invention.

Now, a method for recycling a photographic film according to the present invention will be explained referring to the drawings.

Photographic film to be processed.

In the present invention, a photographic film 81, such as a black and white photographic film, an x-ray photographic film, which has a base made of polyester and which has been disposed of and collected after its use or after its available period, can be used as the photographic film to be processed.

Photographic film shredding step

The above mentioned photographic film is collected and shredded in the shredding step into fragments having a suitable size to be processed.

As shown in FIG. 1, a photographic film 81 is introduced into a conventional shredding means, e.g., a milling cutter, where it is shredded into fragments which are indefinite in shape but have a quadrilateral shape, such as a rectangle or a square, or other shape such as triangle, trapezoid, or rhomboid, and have a size of about 10×10 mm.

The shredding means used for the present invention is not limited to the milling cutter.

Other kinds of shredder can be used in the present invention, for example, several kinds of monocutters, shredders, crushers, such as a Gynax Crusher by Horai Co., Role Crusher by Nara Machinery Co. One example of a construction of crusher is described below. Specifically, a crusher main body is provided with an inlet port at its top through which objects to be shredded are fed. Two shafts are supported in the crusher main body so that they are parallel and rotated inwardly so as to face each other. A plurality of rotary blades are attached to each shaft at a predetermined distance. Three claws are attached so as to be projected, with a predetermined angle, from the outer periphery of each rotary blade. Then, the outer periphery of each rotary blade of one shaft engages that of the other shaft. Thus, with the above claws, the objects to be shredded can be shredded into fragments having the suitable size. Specifically, the objects to be shredded are fed through the inlet port at the top of the crusher main body. Next, the objects to be shredded are introduced into the inside of crusher main body with the claws of rotary blades of two shafts which are rotating inwardly so as to face each other. The objects are slitted due to a shearing force continuously applied between the outer periphery edges of the rotary blades which are rotating while they are engaging each other. Further, the objects are shredded and cut due to a compression force applied upon introduction of the objects. Thus-formed fragments are passed through a screen provided below the rotary blades of the two shafts and discharged through a discharge port.

Swelling step

The fragments to be processed, which have been shredded in the preceding step, are dipped into hot water having a temperature of about 40° C. for about 5 minutes to 1 hour or longer so that the gelatin is swells. In this swelling step, in order to accelerate the swelling of the gelatin, stirring means such as an agitator can be also used.

Dehydrating step

The fragments to be processed, which have been swollen in the preceding step, are dehydrated with a dehydrating means, such as a centrifugal separator, until their moisture content is decreased to about 30 wt %.

Drying, peeling, classifying, and grading step

In this drying, peeling, classifying, and grading step, the following operations are carried out. First, an impact frictional striking force is applied to the fragments to be processed, which have been shredded in the above mentioned shredding step. Then, due to this impact frictional striking force, particularly due to frictional heat caused by impact force, the fragments to be processed are dried. Further, due to this impact force, the layers 84 other than the base 83a, i.e., the protective coat, the emulsion layer, and the base coat layer, (hereinafter referred to as a laminate) are peeled off the base 83a so that the resin material to be recovered 83b composed of the above base 83a can be separated from the laminate 84. Then, due to the above impact force and frictional heat caused from this force, the separated resin material to be recovered 83b is graded. Hence, the resin material 83b and laminate 84 can be classified for individual collecting. More specifically, the fragments to be processed repetitively undergo a smashing and bending action caused from the impact frictional striking force, whereby the laminate 84 is minutely shredded and peeled off the surface of the resin material to be recovered 83b composed of the base 83a of each fragment to be processed. Alternatively, the laminate 84 is partly cut together with the base 83a. Thus, the laminate 84, i.e., the protective coat, the emulsion layer, and the base coat layer, is individually peeled among the layers of photographic film 81.

Subsequently, since the laminate 84 which has been peeled off each fragment to be processed undergoes centrifugal action, the laminate 84 can be easily separated from the surface of the base 83a.

Additionally, since the temperature of the photographic film 81 is increased due to the frictional heat caused at each fragment to be processed by the impact frictional striking force, the photographic film 81, as well as the laminate 84, is dried and solidified. Thus, the laminate 84 can easily be peeled off further.

Figure 5:
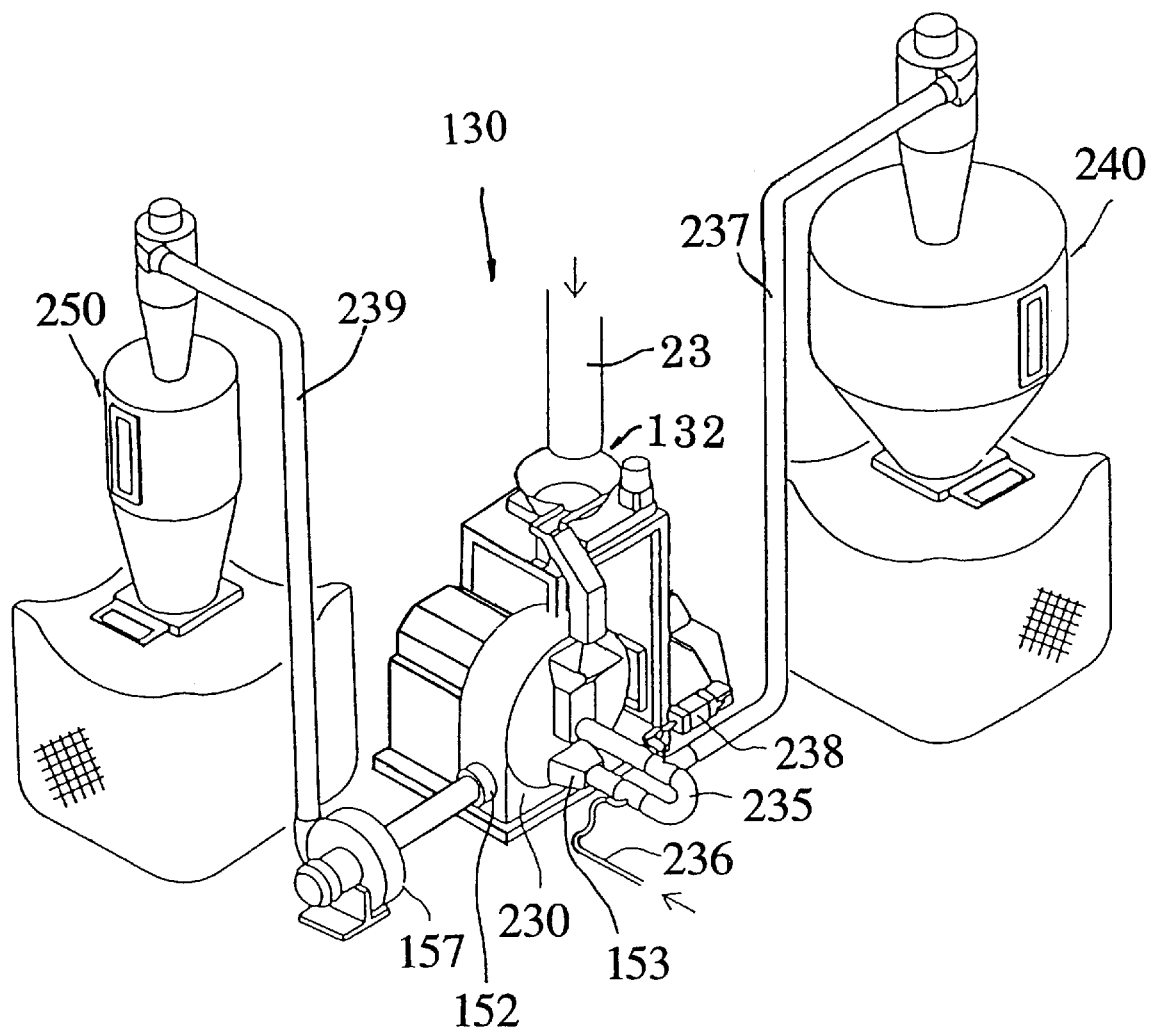
FIG. 5 is a perspective view which totally shows a separator (drying, peeling, classifying and grading means) used in the embodiment of the present invention and equipment communicated with this separator.
Figure 6:
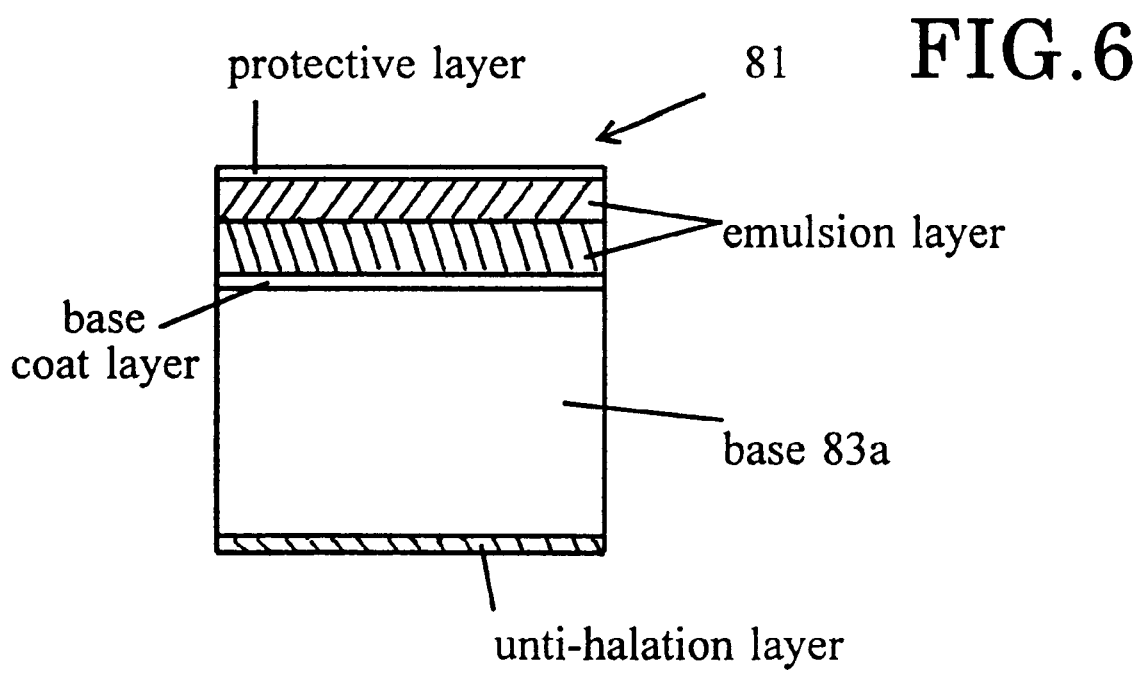
FIG. 6 is an enlarged schematic sectional view showing the structure of a photographic film which is an object to be processed by the present invention.

FIG. 5 shows one example of the composition of a general unit including drying, peeling, classifying, and grading means (in the present embodiment, for convenience's sake, this means is called a separator) used in the method of the present invention.

Referring to FIG. 5, first, the outline of the separator 130 will be explained generally. The separator 130 has an inlet port 132 for feeding each fragment to be processed. The separator 130 has also an outlet port 153 for taking off the resin material to be recovered 83b which is formed by peeling the photographic film 81 having the laminate 84 other than resin material base 83a, i.e., the protective coat, the emulsion layer, and the base coat layer, off the fragments to be processed in its treatment within the separator 130. Further, the separator 130 also has a discharge port 152 for discharging the laminate 84 other than the base 83a, i.e., the protective coat, the emulsion layer, and the base coat layer, which have been separated and peeled from the resin material to be recovered 83b, as well as dust, minute resin material, and the like, which are produced by grinding the surface of each fragment to be processed due to the impact frictional striking force.

Each fragment to be processed, which has been treated in the preceding step, is fed via a supply pipe 23 through the above mentioned inlet port 132. The above mentioned outlet port 153 is in communication with the inlet port 132 via a communication pipe 235. A pipe 236 is connected to a compressed air source (not shown), and is in communication with the outlet port-side of the communication pipe 235. At the communication point of this pipe 236, a current plate is provided so that the compressed air can be mainly fed to the inlet port 132-side. A branch pipe 237 is provided in the communication pipe 235 so as to be in communication with a recovery tank 240 for recovering the resin material 83a. A two-way solenoid valve 238, which is switched at a predetermined time using, e.g., a timer, as required, is disposed at the branch point of the branch pipe 237. The discharge port 152 is in communication with a collecting tank 250 via a discharge pipe 239. The laminate 84, dusts from the other layers, and the like, which have been discharged through the discharge port 152, are introduced into the collecting tank 250 by a suction force, via the discharge pipe 239 equipped with a blower 157.

Figure 2:
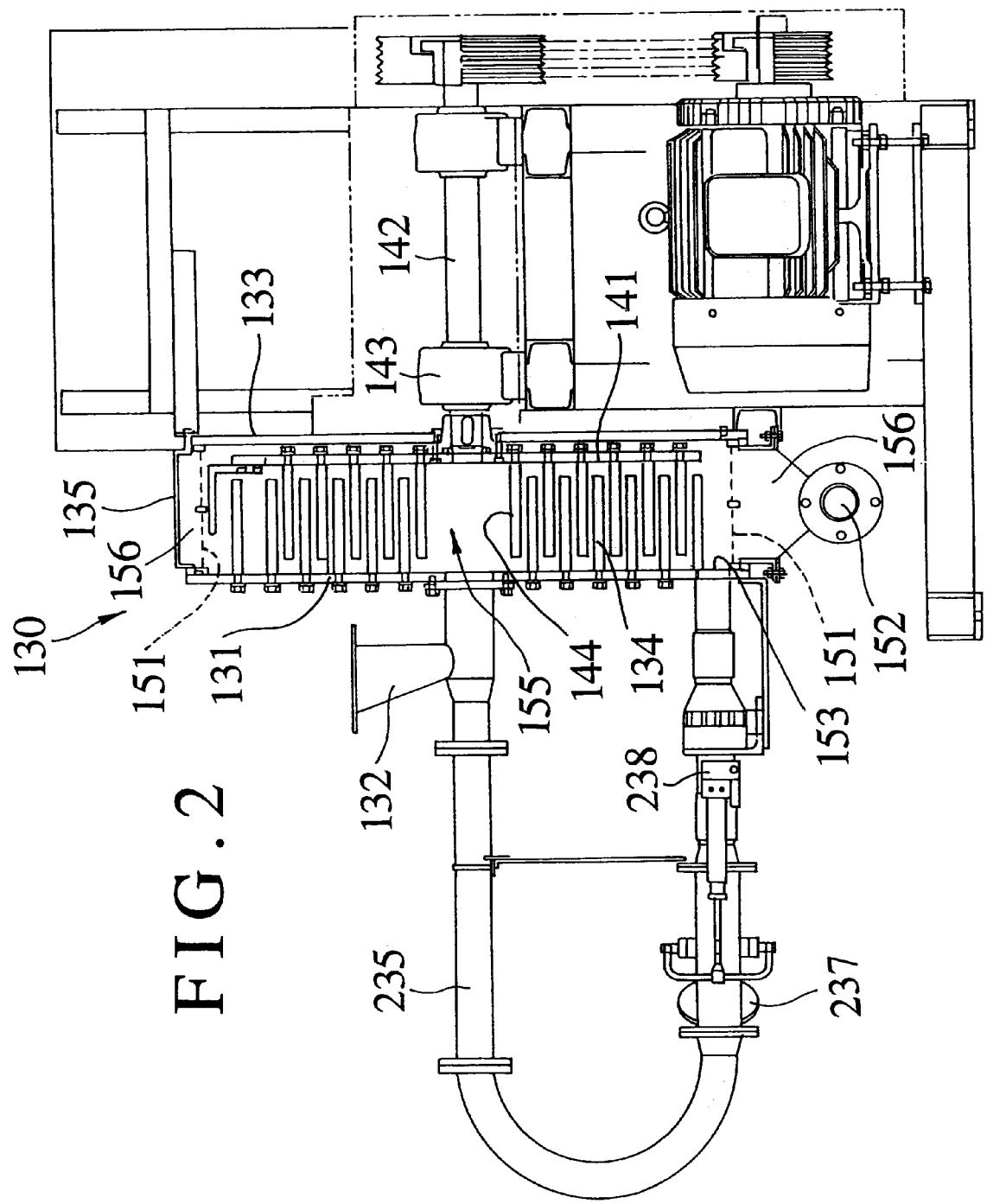
FIG. 2 is a front view which shows the outline of a separator (peeling, shredding, and classifying means) used in the embodiment of the present invention.
Figure 3:
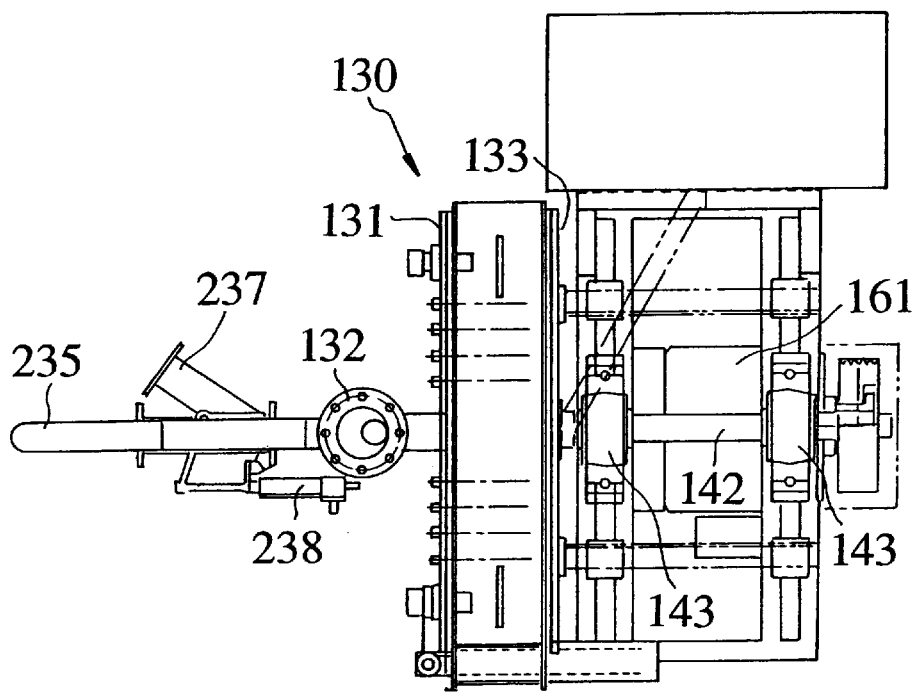
FIG. 3 is a plan view of the separator shown in FIG. 2.
Figure 4:
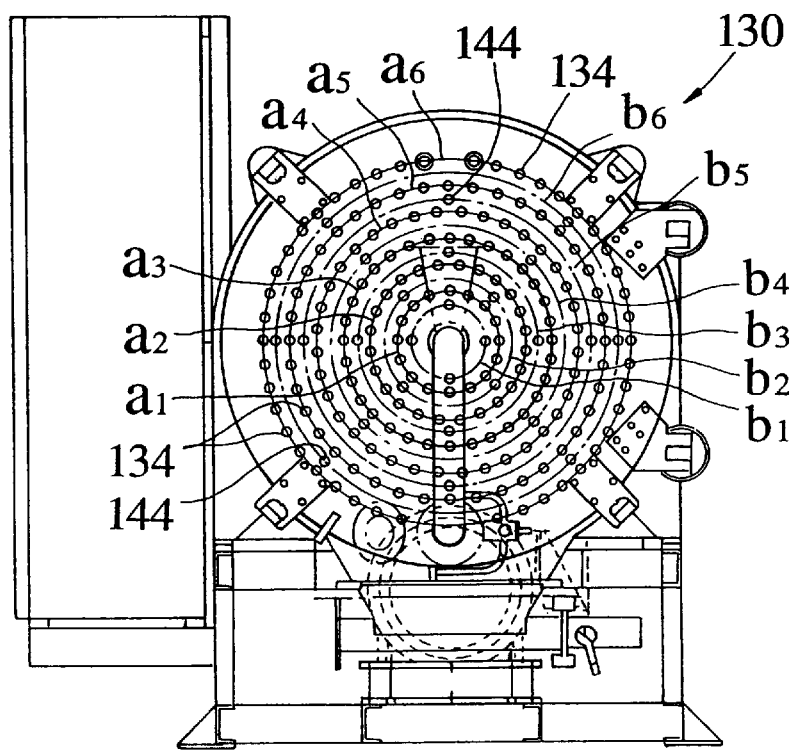
FIG. 4 is a sectional view which shows the outline of the separator of FIG. 2.

As shown in FIGS. 2 to 4, the separator 130 has the following internal composition. Specifically, the inlet port 132 is in communication with and opened at the center of a fixed disk 131. A fixed end plate 133 is positioned so as to be opposite the fixed disk 131 with a processing space 155 ensured between them. The outer periphery of the fixed disk 131 is fixed to the outer periphery of the fixed end plate 133 by means of a circumferential side plate 135. A movable disk 141 is provided in the processing space 155 so as to be rotated by a horizontal rotary shaft 142. The horizontal rotary shaft 142 is supported by bearings 143, 143. The horizontal rotary shaft 142 is rotated by rotating means such as a motor 161.

In the present embodiment, a plurality of fixed pins 134 are attached to the fixed disk 131 so as to form a plurality of concentrically circular patterns (which are relative to the movable disk 141), e.g., six rotary trajectories a1 to a6 (FIG. 4). On the other hand, movable pins 144, which are different in number from the fixed pins 134, are attached to the above mentioned movable disk 141 so as to form a plurality of concentrically circular patterns, e.g., six rotary trajectories b1 to b6.

The six rotary trajectories a1 to a6 and six rotary trajectories b1 to b6 form alternating circular rows. Then the fixed and movable pins 134 and 144 are positioned with respect to each other such that the laminate 84 undergoes effects so as to be peeled off and separated from the fragments to be processed due to the impact frictional striking force between them.

More specifically, the fixed pins 134 are disposed on the fixed disk 131 from its center to its outer periphery in the concentrically circular patterns with a greater number of pins 134 in each successive layer, namely, the numbers of pins 134 are 16-24-32-36-40-42 on the rotary trajectories a1–a2–a3–a4–a5–a6, respectively. Here, the rotary trajectory a1 is located closest to the center of the fixed disk 131, the rotary trajectory a2 is located at the outer periphery-side of the rotary trajectory a1. and the rotary trajectory a6 is located closest to the outer periphery of the fixed disk. On the other hand, the movable pins 144 are disposed on the movable disk 141 from its center to its outer periphery in the concentrically circular patterns, namely, the numbers of pins 144 are 4-4-4-4-4-6 on the rotary trajectories b1–b2–b3–b4–b5–b6, respectively. Here, the rotary trajectory b1 is located closest to the center of the movable disk 141, the rotary trajectory b2 is located at the outer periphery-side of the rotary trajectory b1. and the rotary trajectory b6 is located closest to the outer periphery of the movable disk.

Actually, the frictional striking force applied to the fragments to be processed is reduced by increasing the clearance between the fixed and movable pins 134 and 144, and is increased by decreasing the clearance.

Further, in FIG. 2, on the outer peripheral of the movable disk 141 and inner peripheral of the above circumferential side plate 135, a screen 151 of predetermined mesh, with apertures of a desired diameter formed by punching, is provided circumferentially with a discharging space 156 ensured between the screen 151 and circumferential side plate 135. Then, the discharge port 152 is provided below the discharge space 156. In the present embodiment, the above mentioned screen 151 has meshes which measure 1.5 mm, but preferably 1.3 mm.

The outlet port 153 is provided at the internal side of the screen 151 and at the lower portion of the processing space 155. As explained before, the outlet port 153 communicate with the inlet port 132 via the communicating pipe 235 and also communicates with the recovery tank 240 for recovering the resin materials via the branch pipe 237, which is provided on the inlet port-side of the communicating pipe 235. In another embodiment, by providing a plug valve at the outlet port 153 for controlling its opening and closing, as shown in FIG. 5, the outlet port 153 can communicate with the inlet port 132 via a blower 157 attracting air from the separator 130 with a suction force.

Therefore, in the above separator 130, the horizontal rotary shaft 142 is rotated by the rotating means of the motor 161, so that the movable disk 141 is also rotated. At this time, if the fragments to be processed are introduced into the inlet port 132, the fragments to be processed are subjected to the impact frictional striking force caused between the fixed and movable pins 134 and 144 in the center of the processing space 155. Then, the fragments to be processed repetitively undergo bending action due to the impact formed by the fixed and movable pins 134 and 144. Thus the laminate 84 is minutely shredded and peeled off the base 83a.

But, by application of this impact frictional striking force, the part of resin material 83b composed of the base 83a of each fragment to be processed is also cut and peeled off at its surface together with the laminate.

Additionally, by the frictional heat applied to each fragment to be processed due to the impact frictional striking force, the temperature of the surface of each fragment to be processed is increased. Hence the laminate 84 can be further easily peeled off the surface of each fragment to be processed. More specifically, since the temperature of the photographic film 84 increases due to the frictional heat, the photographic film is dried and solidified, and, at the same time, the photographic film repetitively undergoes smashing action due to the impact of the impact frictional force. Thus, the shredding and peeling action for the laminate 84 is accelerated.

The resin material 83b is recovered in the form of flakes. On the other hand, the photographic film 81 having the laminate 84 from which the resin material 83b has been peeled off, and the above mentioned part of resin material which has been cut, are collected in the form of powder or thin-piece-like fragments having a size of 1.5 mm or smaller.

The laminate 84, which has been separated from each fragment to be processed, and the 10 part of resin material which has been cut, are passed through the screen 151 by virtue of a centrifugal force caused by the movable pins 144 before being classified so as to be in the discharging space 156. Then they are attracted and discharged through the discharge port 152 via the blower 157 so as to be outside.

In the present embodiment, for the blower 157, either a large blower operated at 5.5 kw, 5 kg/cm$^2$/pressure, 2 m$^3$/min. or a compact blower operated at 3.7 kw, 3 kg/cm$^2$/pressure, 1 to 1.5 m$^3$/min. is used, together with the air in the separator 130, to attract the laminate 84 and the like which have been separated from the above fragment to be processed.

The base particles 83a composed of resin material to be recovered 83b which can not be passed through the screen 151 because of their size remain on the screen 151. Then, resin material to be recovered 83b to which the laminate 84 is still attached is mixed with the remaining resin material to be recovered 83b.

However, the outlet port 153 communicates with the inlet port 132 via the communicating pipe 235; thus, the fragments to be processed and resin materials 83b to be recovered, which have been taken from the outlet port 153, are returned to the inlet port 132. In the separator 130, they again undergo smashing and bending action by the impact frictional striking force, whereby the laminate 84 which has been attached to the surface of each fragment to be processed is peeled off, passed through the screen 151, and discharged through the discharge port 152 by means of the blower 157 so as to be outside. On the other hand, the returned resin material to be recovered 83b is not shredded minutely enough so that it is not passed through the screen 151, but remains inside of the screen 151.

The drying, peeling, classifying, and grading step described above can be repetitively carried out several times as desired until the laminate 84 of fragments to be processed formed during the period of one batch can be almost completely separated and discharged through the discharge port.

The separator 130 constructed as stated above is driven by means of rotary driving means 161. The downstream-side of the above communicating pipe 235 is opened by means of three- way solenoid valve 238 while the branch pipe 237-side of the above communicating pipe 235 is closed. Then, by the compressed air supplied from the pipe 236 to the communicating pipe 235, air flow can be circulated through the communicating pipe 235, the inlet port 132, the processing space 155, and the outlet port 153. If the fragments to be processed formed during the period of one batch are supplied to the inlet port 132 via a supply pipe 23, the laminate 84 which has been peeled off the surface of each fragment to be processed and shredded resin material 83b by the treatment in the separator 130 are passed through the screen 151 and conveyed to the collecting tank 250 by means of the blower 157.

On the other hand, the resin material to be recovered 83b remaining on the screen 151 is conveyed to the communicating pipe 235 and returned to the processing space 155 by means of the circulating air flow so as to be treated in the separator 130. These sequential processes are repetitively carried out as desired until the laminate 84 formed during the period of one batch can be completely separated and removed.

At last, after the above treatments, the communicating pipe 235 is closed at its down stream-side with the two-way solenoid valve 238, and is opened at its branch pipe-side. By doing this, the resin materials to be recovered 83b which remain on the screen 151 are recovered in the recovering tank 240 via the branch pipe 237.

The water content of the polyester which is recovered in the recovering tank 240 is about 0.6 wt %. On the other hand, that of the powder polyester and silver (halide) which are collected in the collecting tank 250 is about 8 wt %. If solenoid valves, instead of the above two-way solenoid valve 238, are provided at the above branch pipe 237 and communicating pipe 235, respectively, for opening and closing them, the pipes 237, 235 can be opened and closed alternately with these valves.

Screening (selectively recovering) step

By the above drying, peeling, classifying, and grading step, since the impact frictional striking force is applied to the objects to be processed, the resin material base 83a and the resin material to be recovered 83b are shredded so as to have the same size as that of the laminate 84, and both of them are collected in the collecting tank 250. Subsequently, in the next screening step, the collected resin material and laminate 84 are selected according to their particle sizes for individual collecting.

The sieve opening is 0.2×0.2 mm. The powder polyester, which is resin material to be recovered, is recovered as the oversize. On the other hand, the silver halide, sensitized agent including gelatin, and the like are recovered as the undersize.

A resin material is recovered from a photographic film in accordance with the above method of the present invention. Then, its result will be shown as one embodiment.

TABLE 1

| photographic film | x-ray photographic film after its usage | |
| --- | --- | --- |
| thickness | 0.145 mm | |
| weight | 6 kg | |
| resin material base | | |
| material | polyester | |
| thickness | 0.13 mm | |
| dipping in hot water | 5 min. | |
| dehydrating | water content | 33 wt % |
| separator screen mesh | 1.5 mm | |
| | 45 Hz | 920 rpm |
| process time | 60 sec | |
| recovering tank 240 | base (PET) | 91.4 wt % |
| collecting tank 250 | powder: PET | |
| | silver halide: 8.6 wt % | |
| oversize powder PET | 7.4 wt % | |
| undersize silver halide sensitized agent, etc. | | 1.2 wt % |

The present invention constructed as stated above, with a relatively simple and easy method, from a photographic film to be processed, a laminate which is other than a base, i.e., a protective film, an emulsion layer, and a base coat layer, can be peeled off and removed, whereby only synthetic resin which is a main material of the photographic film can be recovered efficiently for re-use.

Thus the broadest claims that follow are not directed to a machine that is configured in a specific way. Instead, the broadest claims are intended to protect the heart or essence of this breakthrough invention.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for recycling a photographic film comprising a resin material base and a laminate formed of a protective film layer, an emulsion layer, and a lower coat layer, by separating the laminate layers from the resin material base for collecting the resin material, said method comprising:

shredding said photographic film into a plurality of fragments to be processed;

swelling said fragments formed in said shredding step by dipping each of these fragments into solution consisting of hot water at a temperature of about 40° C. to form swollen fragments;

drying said swollen fragments by applying an impact frictional striking force to each of said fragments between fixed and movable pins;

simultaneously peeling layers of the laminate off said fragments while removing the laminate layers that have been peeled off the fragments by passing the laminate layers through a screen, classifying the laminate layers and grading said resin material base so as to be said resin material to be recovered; and subsequently selectively recovering, by screening, said resin material base and silver contained in said emulsion layer.

2. The method for recycling said photographic film according to claim 1, wherein said steps of drying, peeling, classifying and grading are repetitively carried out a plurality of times.

* * * * *